Sept. 16, 1958    J. E. GRIFFIS ET AL    2,852,735
VACUUM TUBE TESTING APPARATUS
Filed March 15, 1955
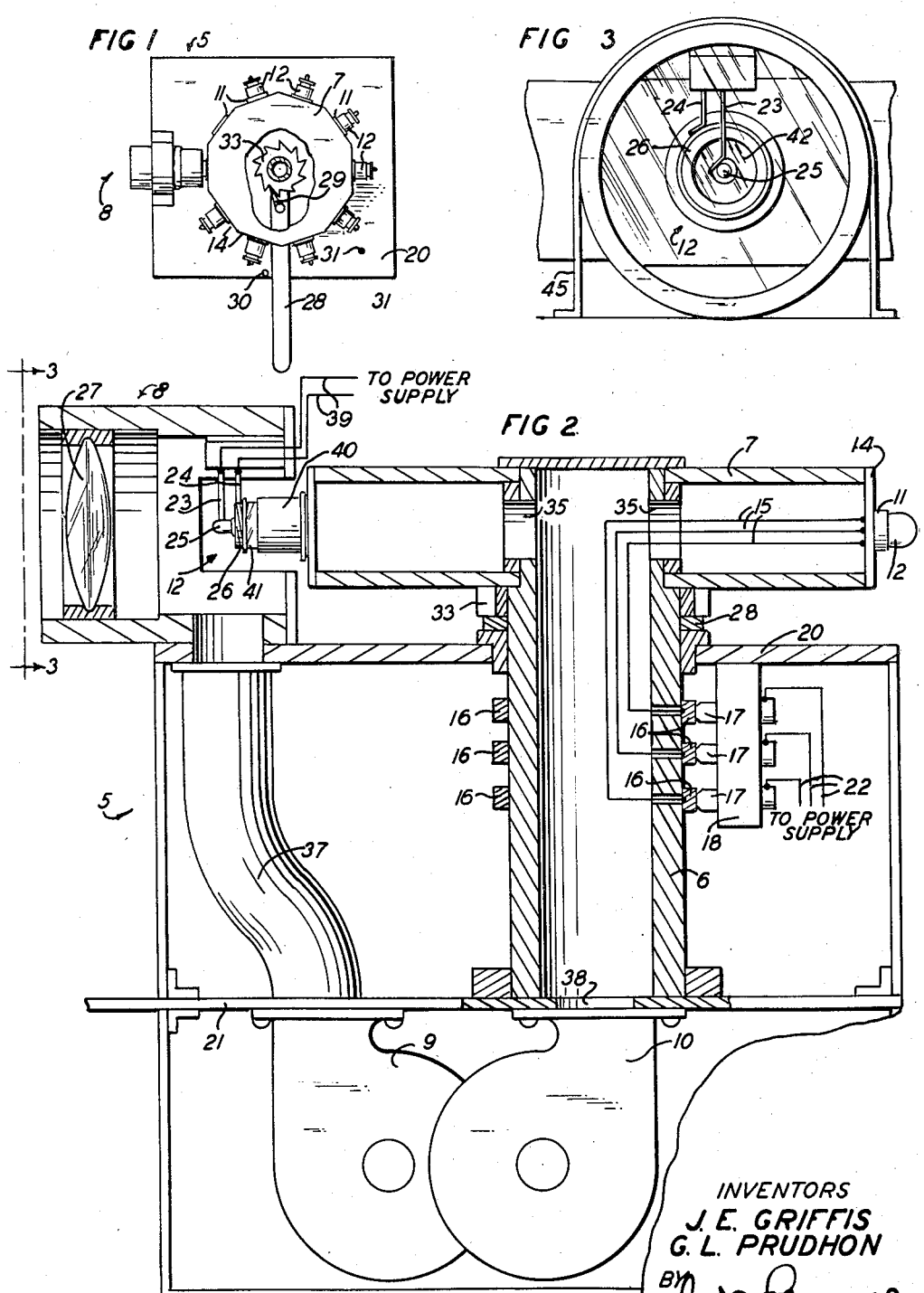
INVENTORS
J. E. GRIFFIS
G. L. PRUDHON
BY
ATTORNEY

United States Patent Office 2,852,735
Patented Sept. 16, 1958

2,852,735

VACUUM TUBE TESTING APPARATUS

Jack E. Griffis, Bethlehem, and Glenn L. Prudhon, Allentown, Pa., assignors to Western Electric Company, Incorporated, New York, N. Y., a corporation of New York Application March 15, 1955, Serial No. 494,338

1 Claim. (Cl. 324—20)

This invention relates to vacuum tube testing apparatus and particularly to apparatus for visually checking vacuum tubes having extremely close electrode spacing.

Heretofore, relatively little trouble was encountered in connection with short circuit faults in vacuum tubes. In the first place, there was little likelihood that such faults would occur due to the relatively large space separation between the electrodes and secondly, if such faults did occur, they were readily detected since they were easily seen through the glass envelopes of the tubes. With the development and the subsequent mass production of vaccum tubes designed for ultra-high frequency systems, however, the occurrence of such faults has substantially increased due to the relatively close electrode spacings required in such tubes which may be for example, in the order of ½ a mil or less. The detection of these faults has also been complicated since these tubes are generally enclosed in composite metal and glass housings which are predominantly metal and afford but limited viewing of the internal elements of the tubes.

It is the object of the present invention to provide production testing apparatus for determining whether the electrodes of such high frequency type tubes are short circuited or apt to become short circuited in later life.

According to the general features of the invention, a rotatable turret has a plurality of sockets for receiving vacuum tubes to be tested and the sockets are wired for preheating the tubes by energizing the filaments. Grid and plate operating potentials are applied to each of the pre-heated tubes automatically when it is moved into a test station by indexing the turret and viewing means at the test station enables the operator to observe the pertinent part of the tube to detect a glow discharge therein due to contact between the electrodes.

These and other features of the invention will be more fully understood from the following detailed description taken in conjunction with the accompanying drawing, in which:

Fig. 1 is a plan view of a device according to the invention with portions of the turret broken away to show indexing means therefor;

Fig. 2 is an elevational view, partly in section, of the device of Fig. 1, and

Fig. 3 is an end view of the viewing tube showing the vacuum tube in the test station.

The vacuum tubes shown in the drawing by way of illustrating the invention are of the type disclosed in Patent 2,527,127 which issued October 24, 1950, to R. S. Gormley, C. Maggs and L. F. Moose. This type of tube embodies a multi-section housing consisting of a metal shell portion 40, an external ring portion 26 (which serves as the grid terminal of the device) sealed by a glass portion 41 to the portion 40, a central anode terminal 25 which supports an anode disc and a glass dome portion 42 sealed to the grid ring portion 26 for supporting the anode terminal coaxially therewith. Pins are provided in a base attached to the end of the shell portion 40 for making connection to the cathode and the heater filament in conventional manner.

In the embodiment shown in the drawing, a housing 5 supports a hollow shaft 6 for a turret 7, optical viewing tube 8 and blowers 9 and 10. Ten tube sockets 11 are mounted on vertical members 14 of the turret for receiving a plurality of vacuum tubes 12. Sockets 11 are all wired in parallel and are connected to slip rings 16 on shaft 6 by wires 15 connected to one of the sockets. Resilient, lever type contact brushes 17 for the slip rings are mounted on a terminal strip 18 secured to member 20 of the housing 5 and are connected to a conventional power supply by wires 22 which supply operating potentials for the cathode and the filament of the tubes so that they may be pre-heated. When a tube 12 is moved into the test station within the viewing tube 8, resilient brushes 23 and 24, which are connected by wires 39 to a conventional power source supplying anode and grid potentials, make contact with the anode pin 25 and the grid ring 26 respectively.

The viewing tube 8 is radially aligned with the turret and shades the test position to permit visual observation of the glass dome seal 42 of the energized tube so that if a sufficient amount of cathode coating material has migrated from the cathode to the anode, a visual glow may be detected. The tube 8 is mounted on the housing 5 by a clamp 45 and a magnifying glass 27 is provided in the viewing tube to facilitate making the observations.

The turret is manually indexed by means of a lever 28 rotatably mounted on shaft 6, the lever having a pawl 29 thereon for engaging a ratchet 33 fixed to the shaft 6 which rotates with the turret. Stop pins 30 and 31 on the plate 20 of the housing limit the travel of the lever 28 to restrict rotation of the turret so that successive vacuum tubes on the turret may be moved into test position.

A blower 10 circulates air through an aperture 38 in the blower mounting plate 21 in the housing through the hollow shaft 6 to the sockets of the tubes by way of apertures 35 in the top of the shaft. Energized tubes in the test station generate substantially more heat than the tubes in the preheated positions on the turret consequently a separate blower 9 is provided for circulating air through tube 37 to the test station.

While the invention has been described with respect to a particular embodiment for purposes of illustration, it will be understood that the device could be modified in various ways in accordance with the general principles of the invention and the requirements of the particular conditions of use, for example, the sockets for the tubes could be mounted on the top of the turret and the viewing tube could be supported above the turret for looking down on a tube in test position.

These and numerous other arrangements may be readily devised by those skilled in the art which will embody the principles of the invention and fall within the spirit and scope thereof.

What is claimed is:

Vacuum tube testing apparatus comprising a multiple position rotatable turret having a plurality of sockets for mounting vacuum tubes radially thereon, wiring means electrically connecting the sockets in parallel, means including slip rings, rotatable with the turret, connected to said wiring means for simultaneously applying preheating currents to tubes on the turret, a fixed test station having brushes to be engaged by the tubes on the turret for applying operating potentials thereto, a viewing tube having a magnifying glass therein for radially observing tubes positioned in the test station to detect a glow discharge therein and ratchet indexing means for driving the turret to successively move vacuum tubes into the test station.

References Cited in the file of this patent

UNITED STATES PATENTS

| | | |
|---|---|---|
| 1,379,188 | Keeler | May 24, 1921 |
| 1,821,240 | Seletzky | Sept. 1, 1931 |
| 2,278,697 | Gould | Apr. 7, 1942 |